United States Patent [19]
Dijkmans et al.

[11] 4,158,109
[45] Jun. 12, 1979

[54] INTERFERENCE INSENSITIVE LINE SUPERVISION CIRCUIT

[75] Inventors: Eise C. Dijkmans; Einar A. Aagaard, both of Eindhoven, Netherlands

[73] Assignee: U.S. Philips Corporation, New York, N.Y.

[21] Appl. No.: 868,806

[22] Filed: Jan. 12, 1978

[30] Foreign Application Priority Data

Jan. 25, 1977 [NL] Netherlands ......................... 7700719

[51] Int. Cl.² ........................ H04M 3/22; H04B 3/46
[52] U.S. Cl. ............................................. 179/18 FA
[58] Field of Search ............. 179/18 F, 18 FA, 81 R, 179/84 R, 16 F, 18 HB, 16 A, 16 AA

[56] References Cited

U.S. PATENT DOCUMENTS

| | | | |
|---|---|---|---|
| 4,022,980 | 5/1977 | Kitajewski et al. | 179/18 HB |
| 4,079,208 | 3/1978 | Rogers et al. | 179/18 FA |

Primary Examiner—Thomas A. Robinson
Attorney, Agent, or Firm—Thomas A. Briody; William J. Streeter; Simon L. Cohen

[57] ABSTRACT

Interference insensitive line supervision circuit for subscriber's line having a given working range for the line potentials. A call can be simulated by the occurrence of overvoltages. Means are applied which supervise the occurrence of overvoltages. In the case of overvoltages these means produce control signals which result in that the state of a line state store cannot be affected by the line supervision circuit.

3 Claims, 1 Drawing Figure

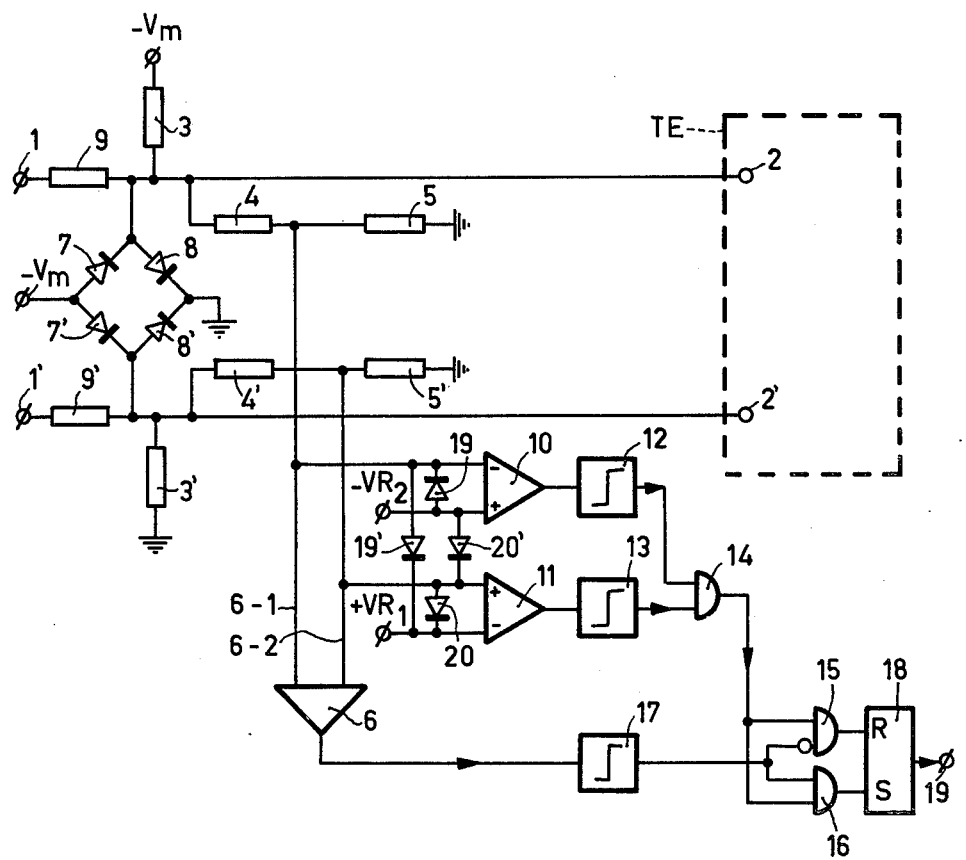

INTERFERENCE INSENSITIVE LINE SUPERVISION CIRCUIT

BACKGROUND OF THE INVENTION

1. Field of the Invention

The invention relates to a connecting circuit for telephone lines which comprises an interference insensitive line supervision circuit connected to the line, which functions when the potentials of the inputs are located within a given working range.

Connecting circuits must be understood to mean those used in the automatic telephony for connecting subscriber's lines to the telephone exchange.

2. Description of the Prior Art

Several means are known to protect telephone lines, such as carbon blocks, gas discharge tubes, fuses and heat coils.

For the protection of the electronic circuits which are connected to the telephone line it is usually desired to clamp the voltage of the line or the inputs of the electronic circuits, connected to the line, against fixed potentials. Clamping diodes are used for this purpose.

The clamping potentials of the clamping diodes then define a given working range for the potentials of the telephone line. On the other hand the normal operation of the line supervision circuit is only ensured if the potentials of the inputs are located within a given potential range.

SUMMARY OF THE INVENTION

If in the situation in which an overvoltage occurs the potentials of the telephone line exceed the working range then it may happen that the line supervision circuit detects as a consequence another state of the telephone line as before the occurrence of the overvoltage.

The result may be that a call is detected whereas the subscriber's loop is actually open. The occurrence of such false calls is, of course, unwanted.

It is consequently an object of the invention to provide a connecting circuit with an electronic line supervision circuit in which the occurrence of false calls, owing to overvoltages, is counteracted.

The connecting circuit according to the invention is characterized in that means are present which react when the potentials of the telephone line exceed the working range to produce signals for controlling blocking means which cooperate with these means and which prevent the line supervision circuit from affecting the state of a line store.

In accordance with a further elaboration the means which react when the line potentials exceed the working range are constituted by d.c. voltage differential amplifiers or operational amplifiers, one input of which is connected to an input of the line supervision circuit and the other input to a reference voltage.

SHORT DESCRIPTION OF THE FIGURE

The sole FIGURE shows an embodiment of a connecting circuit according to the invention.

DESCRIPTION OF THE EMBODIMENT

In the FIG. 1—1' indicates the input terminals of a connecting circuit for a subscriber's line and 2—2' the output terminals thereof.

The wires of a subscriber's line may be connected to the terminals 1—1'. The connecting circuit is connected to the telephone exchange TE by means of the terminals 2—2'.

To the telephone line are connected the supply resistors 3 and 3' which connect the telephone line to the central battery ($-V_m$ and ground).

The wires of the telephone line are connected through the resistors 4 and 5 and 4' and 5' to the input of a line supervision circuit or loop detector 6 in the form of a d.c. voltage differential amplifier. These resistors are only used to bring the voltage at the input of amplifier 6 within the working range by means of voltage division and are high ohmic.

The diodes 7 and 8 and 7' and 8' clamp the voltage of the telephone line against the supply potentials. The low-ohmic resistors 9 and 9' (approximately 10 ohm) limit the current when a clamping diode starts conducting owing to the occurrence of an overvoltage.

Overvoltages on the telephone line may be produced by lightning induction or by induction from power networks. These overvoltages may amount to some thousands of volts and currents of some hundreds of amperes can flow. By means of coarse protection means such as carbon blocks or gas discharge protectors these overvoltages can be limited to some hundreds of volts.

The clamping diodes 7, 8 and 7', 8' together with the current limiting resistors 9 and 9' ensure the fine protection of the electronic circuits which are connected to the telephone line, such as amplifier 6.

If during the occurrence of a voltage surge on the telephone line the voltages of the conductors are clamped on the same potential, any voltage difference between the wires as a result of an open subscriber's loop is then eliminated and loop detector 6 will detect a call.

Such false calls can also be produced if in the loop detector itself the potentials of the inputs are clamped against the supply potentials in the situation that the external clamping diodes 7, 7', 8 and 8' are not present.

This situation can be remedied if the resistors 4 and 4' are of a sufficiently high value to limit the input currents of the loop detector.

In order to counteract the occurrence of false calls owing to overvoltages two d.c. differential amplifiers 10 and 11 are connected to the inputs of amplifier 6. These differential amplifiers compare the voltages of the input 6-1 and 6-2 with the reference voltage $-VR2$ and $+VR1$ ($-VR2$ more negative than $+VR1$).

If the voltages on the inputs 6-1 and 6-2 remain within the range between $-VR2$ and $+VR1$ then the amplifiers 10 and 11 supply a positive voltage which is brought to a logic signal level "1" by the limiters 12 and 13. The gates 15 and 16 are then opened through AND-gate 14.

The output signal of amplifier 6 is brought by limiter 17 to a logic signal level which is "1" in the case of a closed subscriber's loop and "0" in the case of an open loop.

If the gates 15 and 16 are open the signal level of amplifier 6 can set through limiter 17 the bistable element 18 (Set-Reset Flipflop) to the state "1" or "0" depending on the instantaneous state of the subscriber's loop.

If overvoltages occurs, for example a negative voltage surge which energizes the clamping diodes 7 and 7', then the wires of the telephone line are supplied with a voltage which is more negative than $-V_m$ and input 6-1 of amplifier 6 gets a voltage which is more negative than $-VR2$. The logic signal level at the output of limiter 12 then reverses from "1" to "0" and the AND-gate 14 no longer satisfies the AND-condition so that the gates 15 and 16 are closed.

The line state store 18 then retains the state it had before the voltage surge was produced. Overvoltages are usually in the form of a.c. voltages. At the instants that these a.c. voltages pass through zero, and in a small range around it, the input voltages of amplifier 6 will be located in the range between the reference voltages $-VR2$ and $+VR1$ and the bistable element 18 can register the new state, if any, of the subscriber's loop.

The actual state of the subscriber's loop is always indicated at the output 19 of the line state store 18. If the input voltages of amplifier 6 exceed the range between the potentials $-VR2$ and $+VR1$ then the concentration between detector 6 and the loop state store 18 is interrupted and the latter continues to indicate the last state. During the zero crossings of the overvoltage a new state can be registered.

It will be clear that the switching elements 10 and 11 constitute means which react to the potentials of the telephone line exceeding the working range. Blocking means formed by the gates 15 and 16 and which prevent amplifier 6 from effecting a change in the state of the line state store 18 cooperate with these means if the clamping diodes conduct.

Only a low voltage is required for exciting a d.c. differential amplifier or operational amplifier. The inputs of the amplifiers 10 and 11 can then be protected in a simple manner against excessive voltage differences by means of diodes 19 and 20 connected between these inputs. An additional protection can be obtained by connecting the limiting diode 19' and 20' between the inputs of the amplifiers 10 and 11 which are connected to the inputs of the loop detector 6, and the reference voltages $-VR2$ and $+VR1$.

The reference voltages $-VR2$ and $+VR1$ are chosen so that the amplifiers 10 and 11 are not excited in normal circumstances. This means that $-VR2$ is chosen equal to $-Vm$ multiplied by the division ratio of voltage divider 4–5. The reference $+VR1$ can be chosen equal to ground potential. During clamping the voltage of a conductor of the telephone line is a junction voltage (of the clamping diode) higher or lower than the potential (earth and $-Vm$) against which clamping occurs. After voltage division by the resistors 4 and 5 this furnishes a sufficient voltage difference with $+VR1$ and $-VR2$ respectively to drive amplifier 10 and 11 respectively.

What is claimed is:

1. A connecting circuit for telephone lines which comprises a line supervision circuit means for providing signals in response to open and closed circuits of said lines, said line supervision circuit means providing undesirable signals in response to overvoltage conditions on said lines, detection means responsive to overvoltage conditions of the telephone line exceeding a working range of the line supervision circuit for producing signals, a line state store responsive to the line supervision circuit means and changing state in response to signals therefrom, blocking means connected to said detection means for preventing the line supervision circuit from affecting the state of the line state store.

2. A connecting circuit as claimed in claim 1, wherein the detection means which react to the potentials of the telephone line exceeding the working range comprise d.c. voltage differential amplifiers one input of which is connected to an input of the line supervision circuit means and the other input to a reference voltage.

3. A connecting circuit as claimed in claim 1, wherein the blocking means comprise gate circuits which are connected between the output of the line supervision circuit means and the line state store.

* * * * *